J. BIJUR.
MOTOR CONSTRUCTION.
APPLICATION FILED JUNE 4, 1915.
1,278,096. Patented Sept. 10, 1918.
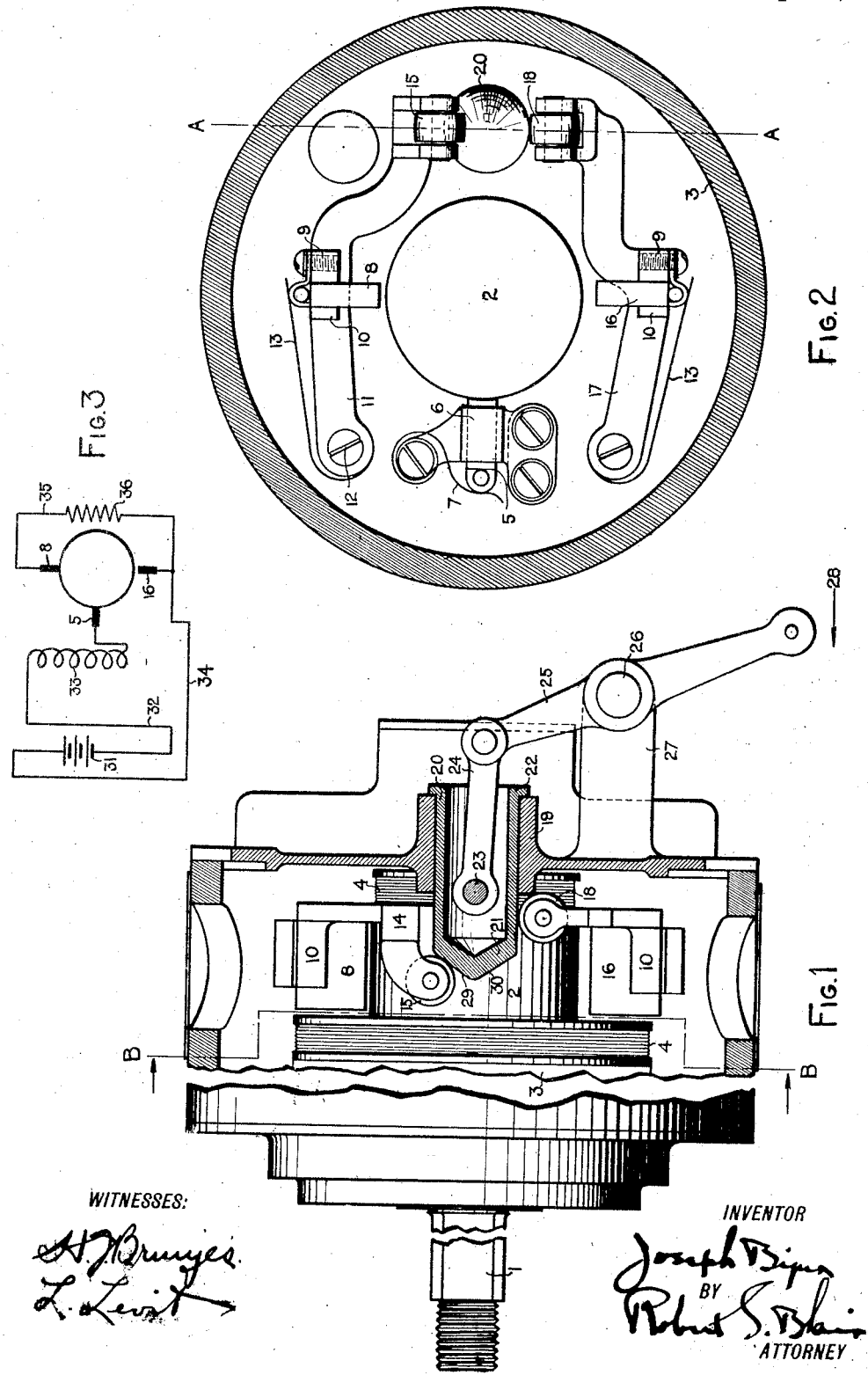

UNITED STATES PATENT OFFICE.

JOSEPH BIJUR, OF NEW YORK, N. Y., ASSIGNOR, BY MESNE ASSIGNMENTS, TO BIJUR MOTOR APPLIANCE COMPANY, A CORPORATION OF DELAWARE.

MOTOR CONSTRUCTION.

1,278,096.　　　　　　Specification of Letters Patent.　　Patented Sept. 10, 1918.

Application filed June 4, 1915. Serial No. 32,061.

*To all whom it may concern:*

Be it known that I, JOSEPH BIJUR, a citizen of the United States, and residing at 122 East 60th street, in the county of New York and State of New York, have invented a new and Improved Motor Construction, of which the following specification is a full disclosure.

This invention relates to the construction of electric motors and the like, and more particularly to motors for use in starting internal combustion engines.

One of the objects thereof is to provide a construction of the above nature which shall be simple, durable and inexpensive and yet efficient in action. Another object is to provide in apparatus of the above nature a compact arrangement of parts which shall be readily accessible and easily assembled or taken apart.

Other objects will be in part obvious and in part pointed out hereinafter.

The invention accordingly consists in the features of construction, combinations of elements, and arrangement of parts, which will be exemplied in the structure hereinafter described and the scope of the application of which will be indicated in the following claims.

In the accompanying drawing, in which is shown one of various possible embodiments of this invention, Figure 1 is a side elevation of an electric motor, certain parts being cut away along the line A—A of Fig. 2 in order to show the construction more clearly. Fig. 2 is a sectional view taken along the line B—B of Fig. 1 looking in the direction indicated by the arrows. Fig. 3 is a diagrammatic plan of electrical connections.

Similar reference characters refer to similar parts throughout the several views of the drawing.

Referring now to Fig. 1 of the drawing, there is shown an electric motor of the type used for starting internal combustion engines, the body of the motor and the shaft extension 1 being broken away, the omitted parts constituting in themselves no feature of the present invention.

This motor is provided with a commutator 2 at the end of the armature 3 and the armature windings as well as commutator segments are bound in position by relatively insulated wire as indicated at 4 in order to withstand the effects of the centrifugal force occasioned by high speed of rotation.

The motor shown is assumed to be of the four-pole type with cross-connected commutator segments, thus giving four neutral points connected one with another in pairs. Substantially at one of the neutral points is positioned a brush 5 slidably mounted in the bracket 6 and urged toward the commutator by the feeding spring 7. Adjacent one of the neutral points of opposite polarity with respect to brush 5 is a brush 8 rigidly mounted between the lugs 9 and 10 upon a lever 11 which is pivotally supported at 12. This lever, with its brush 8, is resiliently urged toward the commutator 2 as by means of a flat spring 13 coiled about its pivot and its free end curves in a direction parallel with the motor shaft as indicated at 14 and is forked about a roller 15 which may be of fiber or other insulating material.

Similarly positioned with respect to the neutral point opposite from brush 8 is a brush 16 which is similarly mounted upon a lever 17 provided with a roller 18, lying substantially in the plane of the roller 15.

Slidably mounted in a guiding sleeve 19 formed in the motor head, and having its center lying substantially in the plane of rollers 15 and 18, is a cam member 20. This member takes the form of a hollow cylinder having a tapered end at 21 and a shoulder 22 at its opposite end, limiting its inward movement. Cam 20 has extending between its inner walls a pin 23 to which is jointed a link 24, the outer end of which is pivotally connected with a lever 25 having at 26 a pivotal mounting upon a lug 27 integral with the head of the machine. Lever 25 is actuated in any desired manner, as, for example, by a connection with the device whereby the motor is placed in driving relation to the engine which it is to start.

Considering, now, the mechanical features above described and understanding that the rollers 15 and 18 rest upon the surface of cam 20, if it be assumed that the free end of lever 25 be swung in the direction indicated by the arrow 28, the cam will be slid outwardly in its bearing in sleeve 19. The first effect of this action is to permit the roller 15 to ride downwardly as the cam surface 29 is withdrawn until brush 8 comes in contact with the commutator and is resiliently held in such position by the spring 13. Continued withdrawal of cam 20 results in the roller 18 reaching and then riding upwardly upon the cam surface 30, whereupon the brush 16 is likewise brought into operative relation to the commutator. It may be noted at this point that the term "commutator" is broadly used to denote a rotary contact member, whether of the segmental type as in direct current dynamos or in the form of an unbroken ring as in alternating current apparatus.

Swinging out of the lever 25 in the opposite direction to return the parts into the position shown in the drawing, first causes the roller 18 to ride down the surface 30 and on to the cylindrical portion of the cam, thus removing brush 16 from the commutator, and later withdraws the brush 8.

Turning now to Fig. 3 of the drawings, there is shown a storage battery or other source of current 31 connected as by conductor 32 through the series field 33 of the motor to the brush 5. The remaining pole of the battery is connected as by any suitable switch through a conductor 34 to the brush 16 and through a branch conductor 35 and resistance element 36 to the brush 8.

In the use of the apparatus, assuming the parts to be in the position indicated in full lines and that it be desired to start the gas engine, the free end of the lever 25 is swung in the direction indicated by the arrow 28. This results first, by the means above described, in bringing the brush 8 against the commutator surface. The motor is thus started slowly inasmuch as the current passes through resistance element 36 and while it is slowly turning over the meshing of the gears between the motor and its load is accomplished. Further movement of the lever 25 brings brush 16 into operative relation to the commutator 2 and causes the motor to turn over with full power. The gas engine with which the motor is connected is thus started and the lever 25 is thereupon swung in the opposite direction. The brush 16 is first withdrawn, thus cutting down the motor current which has already been materially reduced due to the generation of counter-electro-motive force as its speed is increased, and further movement raises the brush 8, the reduced current preventing any tendency to arc at this point and injure the contacting surfaces.

The use of a single cam insures that the desired relative movements of the brush-controlling levers is gained and a reciprocatory cam not only simplifies the construction but enhances the accuracy of action of the parts. Moreover, the single springs 13 serve the functions not only of feeding the brushes as they wear away but of holding the rollers against the cam when the latter is in operative position. As will be seen from the drawing, the parts are so proportioned that a suitable amount of wear of the brushes is permitted without letting the centerline of the rollers pass the centerline of the cam. It will also be seen that the various parts are readily accessible for inspection or repair and that the entire device is simple and of inexpensive construction.

As many changes might be made in the above construction, and as many apparently different embodiments might be made of this invention without departing from the scope thereof, it is intended that all features herein described or shown in the accompanying drawing shall be interpreted as illustrative and not in a limiting sense.

Having thus revealed this invention, I claim as new and desire to secure the following combinations of elements, or equivalents thereof, by Letters Patent of the United States:—

1. In construction of the class described, in combination, a commutator, a pair of brushes adapted to coact with said commutator, a pair of devices respectively controlling the position of said brushes with relation to said commutator, and a single longitudinally movable cam coacting with both of said devices and so shaped as upon movement to cause said brushes successively to move against said commutator.

2. In construction of the class described, in combination, a commutator, a pair of brushes adapted to coact with said commutator, a pair of pivoted levers upon which said brushes are respectively mounted, means resiliently urging said brushes toward said commutator, and a single longitudinally movable cam coacting by surface contact with both of said levers and so shaped as upon movement to cause said brushes successively to move against said commutator.

3. In construction of the class described, in combination, a commutator, a pair of brushes adapted to coact with said commutator, a reciprocating member mounted in a relatively fixed portion of the motor, a lever connected with and adapted to actuate said reciprocating member, means controlled by surface contact with said reciprocating member adapted as it moves in one direction to coact with said brushes successively to cause them to move into contact with said commutator and as it moves in the other direction to cause said brushes to move away from said commutator in the reverse order, and a resistance element connected between said brushes being positioned at neutral points of said commutator of the same polarity.

4. In construction of the class described, in combination, a commutator, a pair of brushes adapted to coact with said commutator, a pair of devices respectively controlling the position of said brushes with relation to said commutator, and a single cam round in transverse cross-section mounted to move substantially in the direction of its axis co-acting with both of said devices and so shaped as upon movement to cause said brushes successively to move against said commutator.

5. In construction of the class described, in combination, a commutator, a brush adapted to coact with said commutator, a lever controlling the position of said brush with respect to said commutator, and a cam round in cross-section and movable substantially in the direction of its axis co-acting with said lever and so shaped as upon movement in one direction to cause said brush to move against said commutator and upon movement in the opposite direction to cause said brush to move away from said commutator.

6. In construction of the class described, in combination, a commutator, a pair of brushes adapted to coact with said commutator, a pair of devices respectively controlling the position of said brushes with relation to said commutator, and a single cam round in transverse cross-section mounted to move substantially in the direction of its axis coacting with both of said devices and so shaped as upon movement to cause said brushes successively to move against said commutator, said cam being mounted for reciprocatory sliding movement in a relatively fixed portion of the motor.

7. In construction of the class described, in combination, a commutator, a pair of brushes adapted to coact with said commutator, a pair of devices respectively controlling the positions of said brushes, a single cam slidably mounted in a part of the motor and coacting with both of said devices to control the position of said brushes with respect to said commutator, a link pivotally connected with said cam, and a lever fulcrumed upon a relatively fixed portion and pivotally connected with said link, said link extending within a recess formed within said cam.

8. In construction of the class described, in combination, a commutator, a plurality of brushes biased toward said commutator, a plurality of devices respectively controlling the position of said brushes with relation to said commutator, and a cam coacting with all of said devices and so shaped as upon movement to permit said brushes successively to move against said commutator.

9. In construction of the class described, in combination, a commutator, a pair of brushes adapted to coact with said commutator, a pair of pivoted levers respectively having said brushes rigidly mounted thereon, a single reciprocating cam circular in cross section coacting with both of said levers and adapted upon movement in one direction to cause said levers successively to engage said cam and upon movement in the opposite direction to cause said levers to withdraw from said commutator, in the reverse order, and a single spring associated with each of said levers urging the same against said cam during its action and resiliently holding the corresponding brushes against the commutator when in contact therewith.

In witness whereof I hereunto subscribe my name, as attested by the two subscribing witnesses.

JOSEPH BIJUR.

Witnesses:
R. S. BLAIR,
H. J. BRUNJES.